United States Patent [19]

Kemeny et al.

[11] Patent Number: 5,385,601
[45] Date of Patent: Jan. 31, 1995

[54] PROCESS FOR CONVERTING ALUMINUM DROSS TO LADLE FLUX FOR STEEL PROCESSING

[75] Inventors: Francis L. Kemeny, Grand Island, N.Y.; David J. Sosinsky, Ellicott City, Md.; Robert J. Schmitt, Murrysville, Pa.

[73] Assignee: Electric Power Research Institute, Palo Alto, Calif.

[21] Appl. No.: 764,693

[22] Filed: Sep. 24, 1991

[51] Int. Cl.⁶ ............................................. C22B 7/04
[52] U.S. Cl. ...................................... 75/748; 75/752
[58] Field of Search ............... 75/10.21, 672, 748, 75/752; 423/111, 133

[56] References Cited

U.S. PATENT DOCUMENTS

| | | | |
|---|---|---|---|
| 4,386,956 | 6/1983 | Roth et al. | 75/672 |
| 4,523,949 | 6/1985 | Gower et al. | 423/111 |
| 4,877,448 | 10/1989 | Lindsay | 75/10.21 |
| 4,960,460 | 10/1990 | Dube et al. | 75/10.21 |
| 4,997,476 | 3/1991 | Lindsay et al. | 75/10.21 |
| 5,132,246 | 7/1992 | Brisson et al. | 75/10.21 |
| 5,135,565 | 8/1992 | Gens | 75/672 |

OTHER PUBLICATIONS

R. Roberts, *Light Metal Age*, 47, 6, (1989).
W. Franger, *Light Metals 1987*, Proc. TMS Conf. Light Metals, 116th Annual Meeting, Denver, Colo., 1987, 799.
A. B. Innus, *Light Metals 1986, pl Proc. TMS Conf. Light Metals*, 115th Annual Meeting, New Orleans, La., 1986, 77.
*Second International Symposium: Recycling of Metals and Engineered Materials;* van Linden, Stewart, and Sahai, Eds. TMS 1990, pp. 451–462.
M. J. Magyar et al., *United States Bureau of Mines*, Report 8446, 1980.

*Primary Examiner*—Melvyn J. Andrews
*Attorney, Agent, or Firm*—Flehr, Hohbach, Test, Albritton & Herbert

[57] ABSTRACT

An indirect plasma-arc processor for aluminum dross is disclosed. The process involves melting aluminum dross in the presence of a flux in a furnace equipped with one or more arc-forming electrodes, wherein the arc is formed with a gas, such as argon. Molten oxides are removed from time to time, and the volatiles are removed via off-gas ducts.

26 Claims, No Drawings

PROCESS FOR CONVERTING ALUMINUM DROSS TO LADLE FLUX FOR STEEL PROCESSING

FIELD OF THE INVENTION

This invention relates to the high-temperature processing of aluminum dross and dross by-products. More particularly, the invention relates to a process for treating aluminum dross and dross by-products at high temperatures in the presence of a flux by use of an indirect plasma-arc furnace. In the presently preferred embodiment, treatment will render the end-products of this process environmentally benign and/or salable to the steel industry and to other industries.

BACKGROUND OF THE INVENTION

Molten aluminum and its alloys are very reactive, in particular with oxygen. Thus, a second phase, referred to as dross, is invariably present on the surface of aluminum melts. Depending on the nature of the raw materials used to generate the melt, and the environment within which the melt is generated, the dross may contain varying amounts of oxides, nitrides, carbides, entrapped metallic aluminum, metals and metal halides.

Aluminum drosses are classified according to the amount of NaCl/KCl salt they contain. Primary aluminum producers use little or no salt in their processes, and the dross they produce is referred to as "white dross". In the secondary refining of aluminum and in aluminum dross processing, NaCl/KCl salt is used more widely. The salts increase the interfacial tension of the dross/aluminum system, and allow the metallic aluminum to coalesce and be separated from the oxide more easily. The salt also helps protect the liquid aluminum from the atmosphere, thereby lessening the likelihood of further oxidation. The resultant drosses produced from these processes contain higher amounts of salt, and are referred to as "black dross".

Dross processors use great quantities of salt in their aluminum recovery process, and the non-metallic product of dross processing is referred to as salt slag; this material is typically composed of over 40% salt.

It is estimated that about 800,000 tons of all types of dross were produced in 1989. Dross is not currently classified as hazardous by the EPA, but black dross and salt slag could be so classified in the near future. Thus, processes are being developed to recycle or stabilize dross residue to produce environmentally harmless residues and technologies for processing aluminum dross to meet possible future environmental regulations concerning disposal of dross in landfills are being sought.

There are two very important aspects to be considered when processing aluminum dross. It is of extreme importance to maximize the recovery of metallic aluminum from the dross. It is of equal importance to produce a waste product that is environmentally compatible or salable to other industries.

The reactivity of aluminum, especially with oxygen, causes melt losses by formation of drosses in all casthouses, shelters, and foundries. The amount of dross produced is very different dependent on the type of operation; it is minimal for the simple holding of liquid aluminum in primary smelters, but large quantities can form when remelting scrap. In all cases, however, considerable quantities of nonoxidized aluminum are trapped in the dross, contributing to costly melt losses. Therefore, foundry engineers have developed many processes permitting the partial recovery of aluminum out of drosses.

Two general categories of dross processing have historically been employed—physical means and chemical means. In the past, recovery of aluminum was accomplished by rather simple physical techniques. For example, hot dross was taken from the furnace and spread on a concrete floor, allowed to cool and hand separated. In other techniques, the hot dross was cooled by placing it on a floor and letting it air cool, by placing it in a rotary tube and cooling it by spraying water onto the outer tube surface, or by pouring it onto a vibrating metal chute for more rapid air cooling. In all of these techniques, the cooled aluminum had then to be separated from the oxides formed during air cooling. All of these processes had serious environmental drawbacks. (R. Roberts *Light Metal Age,* 47, 6, (1989)).

Recently, improved methods for physical dross processing have been developed. The "aluminum recycling oxide separation"0 (AROS) method utilizes an enclosed, oxygen-starved environment for cooling, with collection of dust and fumes. (W. Franger, *Light Metals* 1987, Proc. TMS Conf. Light Metals, 116th Annual Meeting, Denver, Colo., 1987, 799.) The ALCAN process is conducted in an inert argon environment. (A. B. Innus, *Light Metals* 1986, Proc. TMS Conf. Light Metals, 115th Annual Meeting, New Orleans, La., 1986, 777.) ALCAN has developed another dross processing method to be used exclusively for no-salt drosses. (*Second International Symposium: Recycling of Metals and Engineered Materials;* van Linden, Stewart, Sahai, Eds.; TMS 1990, pp 451–462.) This process utilizes a rotary furnace, wherein the charge is heated by a single plasma-arc heater using nitrogen or air as the plasma-forming gas. The process is reportedly ineffective in producing environmentally benign end-products.

Several dross stirring processes to separate granular dross from molten aluminum have been developed, (O. Sivilotti, *Light Metal Age,* 1984, 42, 9.), and a compression method to squeeze the molten aluminum from the dross granules, at very high recovery rates, has also been developed (G. Zahorka, *Light Metals,* Proc. TMS Conf. Light Metals, 115th Annual Meeting, New Orleans, La., 1986, 769.)

Chemical methods of dross processing have also been developed. Disposal of the salt slag produced during the processing of aluminum dross and scrap is of great interest to the secondary aluminum industry. (M. J. Magyar et al., *United States Bureau of Mines,* Report 8446, 1980.) Melting of dross is often carried out under a salt flux cover to dissolve the contaminants, mostly aluminum oxide, and to optimize the recovery of aluminum metal. As the salt flux becomes contaminated with aluminum oxide, it is removed and customarily disposed of in a landfill. However, because the soluble salts in the flux are potentially polluting to surface and ground water supplies, this practice is being discouraged.

Two processes have been developed to deal with the salt slags produced in this way. The US Bureau of Mines (M. J. Magyar et al., *United States Bureau of Mines,* Report 8446, 1980), and Hudson and Olper (*Engitec Impianti, S.p.A,* unpublished report, 1990), have developed similar hydrometallurgical processes to deal with these types of waste.

Using these methods, the salt slag is crushed to produce slag fines. The fine material is sent to a leaching plant for salt brine production and the material is leached to obtain a salt brine with a concentration of approximately 25% by weight sodium/potassium chloride. This brine is filtered and condensed to produce a filtered alumina cake and a stream of salt crystals. Gases created during the process are passed through an afterburner.

Melting of aluminum by electricity, whether by resistance or induction furnaces, offers significant advantages over fossil-fuel melting with regard to energy efficiency and yield of high-quality product. Thus, it would be advantageous to develop more efficient means to melt aluminum for large-scale applications using electricity.

The economic and environmental incentives to recycle aluminum alloys, including dross, have resulted in considerable expansion of the secondary aluminum industry. Scrap for recycling can be of many forms, but often has a large surface area to volume ratio (examples being swarf, turnings, and lacquered scrap). This geometry, together with the high reactivity of aluminum alloys with oxygen, is the cause of metal loss problems associated with melting. Metal loss due to oxidation can be considerable because of the formation of dross. The magnitude of the problem is dependent on alloy composition, physical form of the charge and exposure time in a given environment. For aluminum alloys, the metal loss ranges from between 0.5 to 15% with 2% being considered typical, whereas for certain Al-Mg alloys typical values may be as high as 10%. Thus, would also be advantageous to develop electrical dross processing means which would allow recovery of aluminum from drosses.

Along with the heightened environmental concern regard the landfilling of potentially toxic aluminum drosses, costs of dross disposal have increased and are likely to increase further in the future. Dross is nominally composed of alumina (aluminum oxide) and metallic aluminum, with varying amounts of other oxides, nitrides, leachable metals and metal halides. Therefore any effective dross processing technology must be enough to accommodate compositional variation of significance and must also include a means of separating the metallic aluminum from the non-metallic phase in order to facilitate subsequent recycling.

The use of different fluxes at different temperatures allows for maximum flexibility in the processing of aluminum and salt slags. One means to attain such flexibility is indirect plasma-arc processing, as disclosed in this invention. In indirect plasma-arc processing, the arc is not transferred to the furnace charge electrically, as in many other processes. Thus, one example of plasma-arc prosessing is that in which electrodes arc against each other, with the plasma energy being transferred to the furnace charge primarily by convection and radiation. Another example of plasma-arc processing is that of a non-transferred plasma-arc torch, in which a plasma is generated within a water cooled torch between anode(s) and cathode(s) contained within the torch. In this case, energy is similarly transferred to the furnace charge by convection and radiation. Processing by both of these means, and other means of plasma-arc processing, is contemplated by this invention.

Depending upon the required end product, use can be made of indirect plasma-arc in combination with many available flux systems. If the end point of the processed dross is a landfill, then the cost of processing can be reduced by choosing the most cost effective, environmentally stable flux system. If the end product is a salable material, then the ingredients that will make up the flux need to be carefully selected depending on the desired market of the material.

Processing of aluminum drosses at high temperatures has the advantage of driving off volatile materials, such as chlorides, Cd, and Pb. This allows the resultant slag to be free of environmentally hazardous contaminants. The contaminants appear in the waste stream and are effectively isolated by selective condensation. Depending on the furnace atmosphere, high-temperature processing has the drawback of oxidizing, carburizing or nitrogenizing the entrapped aluminum, and reducing the recoverable fraction. This is addressed through a crushing and separation step conducted prior to high temperature processing, which allows a substantial separation of metallic aluminum from an alumina/metallic aluminum mixture, the latter forming part of the charging material.

The indirect plasma-arc heating process is thermally less efficient than direct heating, but is ideally suited for processing a nonconductive charge. The electrodes, either prepositioned or adjustable to arc toward another, can be directed toward the charge, making use of convective as well as radiative heat transfer, allowing optimal heating efficiency. The furnace capabilities are best utilized if the metallic aluminum content of the dross is low.

Both low and high temperature flux systems have been investigated in the present invention. The low-temperature fluxes were mainly borate based, while the higher melting temperature fluxes consisted of borosilicates, silicates, and calcium silicates. Both high and low-temperature processes have associated advantages and disadvantages. In all three of the base flux systems, compositions were identified that would dissolve aluminum dross. However, not all the slag systems could render the dross environmentally stable.

The advantages of low-temperature processing are in energy savings and increased aluminum recovery from the drosses. At lower temperatures, the amount of energy required to melt the flux-dross mixture is significantly reduced and there is no need for handling materials at elevated temperatures. For example, processing aluminum dross in a dc plasma-arc furnace at approximately 1200° C. has the advantage of keeping the oxidation of the entrapped aluminum to a minimum.

One of the objectives leading to the process of this invention was to maximize the recovery of metallic aluminum from the dross. Lower operating temperatures lessen the thermodynamic driving force for the oxidation of aluminum. The only oxide-based flux system identified that would function at lower temperatures were borate-based fluxes. All the early flux compositions were based in this system. Borates melt at low temperatures and dissolve the drosses well and produce glassy, stable slags. However, they are extremely leachate sensitive and occasionally leachate toxic. Therefore, from the viewpoint of environmentally stable materials, borates cannot be employed for the processing of aluminum drosses.

Because borates cannot be used as the base flux system, elevated temperatures must be employed in order to meet the objective of producing an environmentally stable, landfillable, residue or slag. The use of elevated temperatures allowed for the investigation of several flux systems other than borates, these included silicates and calcium silicates. For example, Flux SL20 is presented in TABLE I along with other fluxes of this invention, although the invention is not limited to the fluxes listed therein. Flux SL20 is an example of a silicate-based flux, modified by equal amounts of CaO and MgO, on a weight basis, and can dissolve up to 30 wt % $Al_2O_3$ at 1550° C.

Raw materials are inexpensive and the flux systems chosen have exhibited high solubility for alumina ($Al_2O_3$). As indicated by the leachate tests, once the dross has reacted with the basic flux, such as that presented in TABLE I, it is rendered inert and environmentally stable. For example, SL21 has a solubility for alumina of 35 wt % at 1400° C. The resultant slag after processing will consist of $CaO—Al_2O_3—S_iO_2—MgO$. (See Table II.)

The process described in this invention is by no means limited to processing dross with only a single flux composition. Depending on the desired product and base dross, an oxide flux can be engineered to produce the required product upon reaction with the dross. For some applications, the product may not be required to be environmentally benign. For example, borates have been demonstrated to be leachate toxic; however, borates can be used if the required reaction product was a feed stock for borax-based flux manufacturers. Because the processing temperatures will be elevated, the crushing of the dross to liberate maximum entrapped aluminum may still be desirable prior to melting.

Thus, a waste stream processor coupled to an indirect-arc furnace employing novel and innovative oxide flux technologies has been developed in response to the aforementioned environmental and economic considerations. A dross charge is melted in the presence of a basic flux by one or more arc-forming electrodes with a gas, provided through the electrode to form a plasma medium.

The products formed by melting the dross in this manner are removed as molten oxides, for resale or as environmentally benign end-products, or both. The volatile products may be removed by an off-gas duct or similar mechanism.

The present invention involves novel fluxing technology that will render the by-products of aluminum dross either environmentally stable or will compositionally modify the dross to make it attractive to other industries as a raw material.

The processor has been developed to handle all manner of aluminum production waste streams and render them environmentally compatible or alter them into salable products. The process of this invention is more clearly described in the following sections of this application.

It is an object of the present invention to provide a dross treatment process which maximizes the recovery of metallic aluminum while emphasizing the production and treatment of waste products to result in end-products that are environmentally benign, or salable to other industries, or both.

It is a further object of this invention to provide a dross treatment process capable of flexibly responding to the treatment of drosses of varying composition, by providing flexible flux engineering to obtain desirable end-products.

SUMMARY OF THE INVENTION

The invention provides a process for treating aluminum dross and dross products. The process involves pretreating the dross to remove a substantial amount of metallic aluminum, and mixing the remaining alumina/metallic aluminum mixture with a flux to form a charging material. The charging material is melted in a furnace provided with one or more indirect plasma-arc electrodes, using a gas, such as argon, to form the plasma.

Metal oxide products of the melting are removed and are salable or environmentally benign end-products. Volatile products of the melting are removed via off-gas ducts. The volatile components may be further treated to separate out further salable by-products and to remove noxious or unwanted gases.

DETAILED DESCRIPTION OF THE INVENTION

In the presently preferred embodiment, aluminum dross, regardless of impurity content, is preprocessed by crushing, sizing and mixing, to separate substantially metallic aluminum from an alumina/metallic aluminum mixture. The resultant mixture will contain up to about 15% metallic aluminum, although mixtures with aluminum content of up to about 50% are useful for the practice of this invention.

This mixture or aluminum dross should be combined with a preselected or custom-engineered flux. The flux and mixture or dross are well mixed, to form a charging material, prior to charging the furnace. The charge may be dropped in, or injected into the molten part of the bath, or otherwise introduced into the furnace. Preheating by slow charging is also a possibility, but partial fusing of the feed stream is possible and must be anticipated.

In the presently preferred embodiment, three arc-forming electrodes protrude into the furnace, although a different number of electrodes may be used. Although hollow graphite electrodes exhibit very high efficiencies for the process of this invention, a varietey of alternate electrode types, including water-cooled plasma torch electrodes, may be useful with the process of this invention, alone or in combination with graphite or other electrodes.

Furnaces useful with this invention are widely known in the art. The furnace will preferably be lined with a refractory material. For example, magnesium oxide (MgO) may be used with this invention, although a graphitic working lining is the presently preferred refractory material. Cooling fingers, or otherwise cooling the furnace lining, may be advantageous if the furnace charge is reactive with the refractory lining at elevated temperatures.

The electrodes are fixed according to the furnace/load parameters, or are anglably adjustable as to angle off the vertical axis and depth in the furnace. The electrodes protrude into the furnace at angles corresponding to optimum heat transfer to the bath and furnace volume.

In the presently preferred embodiment, three anglably adjustable electrodes are used; these are preferably three-phase AC electrodes. The power required for the application will vary with the configuration and size of the furnace. Power sources in the range from 500 kilowatts to greater than 50 megawatts will be useful, depending on the application.

An arc is struck between the electrodes and is maintained by injection of a plasma-forming gas, such as Ar, $H_2$, He, carbon dioxide, methane, or combinations thereof. This arc-forming gas contributes to the atmosphere within the furnace, decreasing oxidative reaction of the aluminum. The arc-forming gas may be supplied at a variety of flow rates and pressures, depending on the configuration of the furnace and on the charge. Argon gas will commonly be supplied at, for example, 3–5 liters/minute per electrode when at about 25 psi for a power of 50 kilowatts. In a presently preferred embodiment, the argon is supplied at 0.5–6 standard cubic feet/minute per electrode.

Heat is applied to the charge by the plasma to fuse the oxides and vaporize the volatile components. Although radiative and convective mechanisms melt the charge throughout, the charge may also be stirred by electromagnetic or mechanical means. The molten oxide is tapped from the furnace from time to time, while the charge is fed continuously or in batches. In the presently preferred embodiment, the charging material is added to the furnace periodically, and the molten oxides are tapped from the furnace periodically when accumulation reaches furnace capacity.

In the preferred embodiment, the oxide product is environmentally benign, and is landfillable, or can be manufactured into a by-product with application in the steel industry. The volatile components are conducted through an insulated off-gas duct, and may be further processed into salable and/or environmentally benign end-products.

In a preferred embodiment, the volatile gases having left the furnace are passed through one or several condensers, and ultimately through filters and afterburners. This further processing allows separation of salable sodium and potassium chlorides, heavy metal salts, and burning or scrubbing of noxious gases, and results in reusable and/or environmentally benign end-products.

The primary condensate is then sold to the secondary aluminum industry for reuse, since this material is primarily a NaCl/KCl flux. The secondary condensate, containing hazardous lead components and heavy metals, is sold to a lead smelter or otherwise. The baghouse dust is recycled in the dross processing furnace.

For example, in one or more first condensers, the sodium and potassium chloride is substantially recovered as condensate. This material can be removed from the condenser from time to time, processed and returned to the aluminum industry as salt flux. The heavy metal chlorides and remaining volatiles, now highly concentrated, are removed as condensate by one or more second condensers. The gas is further cooled and passed through one or more filters to remove any remaining particulate.

The gas may then be passed through an afterburner, if necessary, to ignite and oxidize any hydrogen or carbon monoxide or noxious gas produced in the process. The final exhaust gas will therefore be primarily carbon dioxide, water vapor, and argon.

In this manner, the environmentally hazardous dross has been converted to landfillable and recyclable by-products and a highly concentrated heavy metal chloride waste stream. This waste stream can be disposed of as raw material for zinc, lead or cadmium metal production.

The invention will be more specifically defined by the following examples.

EXAMPLE 1

The processing of black drosses containing varying amounts of NaCl/KCl has been tested using the indirect plasma-arc in combination with an a silica based flux, SL20, and a CaO based flux designated SL21. These high-melting-point fluxes were designed for use in the following experiments. The silica based flux was formulated to aid in dross vitrification, while the CaO based flux was designed to produce a salable product for use in the steel industry.

The compositions of these two fluxes are given in Table I. SL20 has the capacity to dissolve up to 30 wt % alumina. SL21 has a solubility for alumina in excess of 35% by weight. The high alumina solubility of these fluxes make them excellent candidate materials for dross dissolution.

TABLE I

High Temperature Flux Compositions

| Flux | $SiO_2$ | $Al_2O_3$ | $B_2O_3$ | CaO | MgO | $Na_2O$ | Optical Basicity |
|---|---|---|---|---|---|---|---|
| SL20 | 71.40 | 0.00 | 0.00 | 14.30 | 14.30 | 0.00 | 0.560 |
| SL21 | 10.80 | 0.00 | 0.00 | 81.50 | 7.70 | 0.00 | 0.886 |

The indirect plasma-arc furnace was used for dross processing with very high local temperatures to promote vaporization of volatile dross components. In addition, this type of furnace, with electrodes inclined toward the charge, provided sufficient stirring energy in a small furnace volume.

Experiments were conducted using SL21 as the fluxing agent with a 1:1 dross to flux ratio. Three drosses were reacted with this flux to determine its characteristics as an alumina dissolution medium. Experiments were conducted by crushing and premixing 5 lbs of dross with 5 lbs of SL21 and heating the mixture with the indirect plasma-arc until it was completely molten and at a temperature of approximately 1490 degC., approximately 10 minutes. After the mixture reached a steady state it was tapped from the furnace and subsequently analyzed for composition and environmental compatibility. The results of indirect plasma-arc dross processing are outlined below.

Test 1

Flux: SL21 (5 lbs)
Dross: B (5 lbs)
Temperature at tap=1520° C.
Time to steady-state=12 minutes Test 2

Flux: SL21 (5 lbs)
Dross: A (5 lbs)
Temperature at tap=1490° C.
Time to steady-state=10 minutes Test 3

Flux: SL21 (5 lbs)
Dross: C (5 lbs)
Temperature at tap=1510° C.
Time to steady-state=11 minutes In all cases, a fluid slag was obtained at temperatures from 1490° to 1520° C. These slags contained from between 25.6 to 43.1 weight % alumina, indicating that SL21 is excellent for dross dissolution. Each dross processed using flux SL21 passed all Schedule 4 Leachate Quality Criteria (USEPA). This indicates that the resultant slag material is nonhazardous and can be safely landfilled. Based on these results, the indirect plasma-arc furnace used with a CaO based flux, such as SL21, provides an excellent aluminum dross processing system.

Table II lists the resultant slag compositions produced after reacting SL21 with drosses A, B and C. The median resultant slag compositions indicated in Table II demonstrates that processing of drosses with flux SL21 produces a by-product slag that is salable to the steel industry. The composition corresponds roughly to the 12CaO.7Al$_2$O$_3$ calcium aluminate compound. The added SiO$_2$ at a concentration of approximately 16% helps lower the melting temperature of this material to less than 1400° C. The widespread implementation of ladle steelmaking has created a demand for low-melting-point calcium aluminates.

TABLE II

Resultant Slag Composition Ranges Produced By Processing The Drosses With Flux SL21

| Oxide | Composition Range | Median |
|---|---|---|
| CaO | 29.8–46.1% | 37.95% |
| Al$_2$O$_3$ | 25.6–43.1% | 34.35% |
| SiO$_2$ | 13.4–18.0% | 15.70% |
| MgO | 3.70–6.60% | 5.150% |

EXAMPLE 2

This example describes the processing of salt containing drosses. The dross is first crushed to −6 mesh to liberate as much of the metallic aluminum as possible. The metallic aluminum is removed and sold to a secondary aluminum smelter or it is remelted internally. The crushed dross is then mixed with CaO flux SL21 in a 1:1 ratio. This combination of materials is then fed into the dross processor and melted. The products of the processing are salable slag and off-gas. The salable slag is the product of the dissolution of alumina by SL21. This material is poured out of the furnace and allowed to solidify. The condensate is removed from the off-gas stream and baghouse dust is recycled. After the slag solidifies, it is crushed to ½" by ¼" for sale to the steel industry. The crushing also liberates any aluminum that has escaped the primary crushing stage and the high-temperature processing. This aluminum is also recycled.

EXAMPLE 3

This example describes the processing of salt containing drosses. The dross is first crushed to −6 mesh to liberate as much of the metallic aluminum as possible. The metallic aluminum is removed and sold to a secondary aluminum smelter or it is remelted internally. The crushed dross is then mixed with the silicate based flux SL20 in a 1:1 ratio. This combination of materials is then fed into the dross processor and melted.

The products of the processing are landfillable slag and off-gas. The landfillable slag is the product of the reaction of SL20 and the salt containing dross. This material is poured out of the furnace and allowed to solidify. The condensate is removed from the off-gas stream and the baghouse dust is recycled.

After the slag solidifies, it is crused to −½". The crushing allows for the liberation of any aluminum that has escaped the primary crushing stage and the high temperature processing. This aluminum is also recycled. The −½" slag is environmentally benign and can now be landfilled.

What is claimed is:

1. A process for converting aluminum dross in a furnace equipped with one or more plasma-arc electrodes into a slag composition suitable for use as a ladle flux for steel processing, said process comprising the steps of:
   a) selecting an aluminum dross to be treated;
   b) selecting a calcium oxide based and silicon oxide based flux to be mixed with said aluminum dross;
   c) mixing said aluminum dross with said flux to form a charging material;
   d) introducing said charging material into said furnace;
   e) melting both said dross and said flux of said charging material by providing arc-forming energy to said electrodes and adjustably flowing a plasma forming gas to said melted dross and flux to form vaporized volatile components and molten oxides substantially free of said volatile components, said molten oxide capable of solidifying into a low melting point calcium aluminate slag composition suitable for use in steel processing;
   f) tapping said molten oxide from said furnace; and
   g) removing substantially all said volatile components from said furnace.

2. A process of claim 1, wherein said aluminum dross is pretreated by crushing, to form separable substantially metallic aluminum and an alumina/metallic aluminum mixture, said mixture to be separately mixed with the flux of step b).

3. A process of claim 1, wherein said flux is premixed.

4. A process of claim 1 or 2, wherein said flux is mixed in response to the composition of said aluminum dross or said alumina/metallic aluminum mixture.

5. A process of claim 1, wherein the slag composition includes about 13%–18% SiO$_2$, by weight, and about 30%–46% CaO, by weight.

6. A process of claim 5, wherein said slag composition further includes about 25%–43% aluminum oxide, by weight, and about 4%–7% MgO, by weight.

7. A process of claim 1, wherein said molten oxides are heated to a temperature between about 1490° C. to about 1520° C.

8. A process of claim 4, wherein the low melting point of said slag composition is less than about 1400° C.

9. A process of claim 1, wherein said volatile components are further treated by subjection to condensation.

10. A process of claim 9, wherein said volatile components include sodium chloride and potassium chloride, and said treatment removes at least a portion of said sodium chloride and said potassium chloride by condensation.

11. A process of claim 9, wherein said volatile components include heavy metals, and said treatment further removes said heavy metals by condensation.

12. A process of claim 9, wherein said volatile components include particulate materials, and said treatment further removes said particulate materials by filtration.

13. A process of claim 9, wherein said volatile components include noxious gases, and said treatment further removes said noxious gases by subjection to an afterburner or to scrubbing.

14. A process of claim 9, wherein said volatile components are treated by subjection to a condensor to remove substantially all volatiles, to form volatile gases and particulate material.

15. A process of claim 14, wherein said particulate material is further subjected to gravity density separation to separate substantially separate salt and heavy metal fractions.

16. The process of claim 1, wherein said process is a batch process.

17. The process of claim 1, wherein said process is a continuous process, with periodic tapping of the furnace to remove said oxides.

18. A process of claim 1, wherein said plasma forming gas is selected from the group consisting of argon, hydrogen, helium, nitrogen, methane, and mixtures thereof.

19. The process of claim 18, wherein said plasma-forming gas is argon.

20. A process for treating aluminum dross to form a slag composition substantially free of volatile materials and suitable for use as a ladle flux for steel processing, said process comprising the steps of:

a) selecting an aluminum dross to be treated;

b) selecting a calcium oxide based and silicon oxide based flux to be mixed with said aluminum dross;

c) mixing said aluminum dross with said flux to form a charging material;

d) melting both said dross and said flux in a furnace having a chamber and being capable of producing sufficiently high local temperatures to melt said charging material to form volatile components and a molten oxide substantially free of said volatile components;

e) removing substantially all said volatile components from said furnace chamber through off-gas techniques; and f) tapping said molten oxide from said furnace chamber, said flux being capable of solidifying into a low melting point calcium aluminate slag composition suitable for use in steel processing.

21. The process of claim 20, wherein the low melting point of said slag composition is less than about 1400° C.

22. The process of claim 20, wherein the step of selecting aluminum dross is accomplished by preprocessing the aluminum dross by:

crushing, sizing and mixing, the dross; and substantially separating the metallic aluminum from an alumina/metallic aluminum mixture of dross.

23. The process of claim 22, wherein the slag composition includes about 13%–18% $SiO_2$, by weight, and about 30%–46% CaO, by weight.

24. The process of claim 23, wherein said slag composition further includes about 25%–43% aluminum oxide, by weight, and about 4%–7% MgO, by weight.

25. The process of claim 20 further including the step of:

between the melting step and the tapping step, introducing a plasma-forming gas into said furnace chamber to form said molten oxides and said volatile components.

26. The process of claim 20, wherein
said volatile components include chlorides, Cd and Pb.

* * * * *